US011983443B2

(12) United States Patent
Hinkle

(10) Patent No.: US 11,983,443 B2
(45) Date of Patent: May 14, 2024

(54) MULTI-ACCESS MEMORY MODULES

(71) Applicant: Lenovo Enterprise Solutions (Singapore) Pte Ltd., Singapore (SG)

(72) Inventor: Jonathan Hinkle, Raleigh, NC (US)

( * ) Notice: Subject to any disclaimer, the term of this patent is extended or adjusted under 35 U.S.C. 154(b) by 111 days.

(21) Appl. No.: 17/957,059

(22) Filed: Sep. 30, 2022

(65) Prior Publication Data

US 2024/0111454 A1 Apr. 4, 2024

(51) Int. Cl.
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC ..... G06F 3/0659; G06F 3/0607; G06F 3/0679
USPC .......................................................... 711/154
See application file for complete search history.

(56) References Cited

U.S. PATENT DOCUMENTS 10,394,460 B1 * 8/2019 Patel ..................... G06F 3/0611
10,475,506 B1 * 11/2019 Chang ................. G11C 11/4076
11,068,161 B1 * 7/2021 Chen ..................... G06F 13/105
2018/0225235 A1 * 8/2018 Lee ..................... G06F 11/1048
2019/0212769 A1 * 7/2019 Carlough ............ G06F 13/1689
2020/0076652 A1 * 3/2020 Shi ...................... G06F 13/1689
2020/0126609 A1 * 4/2020 Kim ...................... G06F 3/0604
2020/0335139 A1 * 10/2020 Lee ......................... G11C 8/12
2021/0304800 A1 * 9/2021 Lee ......................... G11C 8/12
2021/0327489 A1 * 10/2021 O ........................ G11C 11/4078
2022/0007508 A1 * 1/2022 Stewart .................. H05K 1/117
2022/0335994 A1 * 10/2022 Katoch .................. G11C 5/025

* cited by examiner

*Primary Examiner* — Christopher B Shin
(74) *Attorney, Agent, or Firm* — Jeffrey L. Streets

(57) ABSTRACT

An apparatus includes a plurality of data buffer and multiplexer devices that communicate data signals with the host memory controller at twice the clock rate that the data buffer and multiplexer devices communicate first and second data signals with first and second memory modules. The apparatus further includes a registered clock driver that communicates host command and address signals at twice the clock rate that the registered clock driver communicates first and second command and address signals with the first and second memory modules. The second data signals and second command and address signals may be directed to a data conversion module that converts the signals to be communicated over a serial computer expansion bus with the second memory module.

20 Claims, 4 Drawing Sheets

DRAM Chips 44
42
CXL Memory Module
CXL Memory Controller
40
10
20
serial comm.
Dual Inline Memory Module (DIMM)
Multi-Access Memory Module (MAMM) CXL Logic
70
MDQ[0:7] MDQ[8:15] MDQ[16:23] MDQ[24:31] MDQ[32:39] MDQ[40:47] MDQ[48:55] MDQ[56:63]
60
DCA PCH-1
22
DCA PCH-0
RCD
DCA buffer
BCOM
DRAM
DB
50
DQ[0:7] DQ[8:15] DQ[16:23] DQ[24:31] DQ[32:39] DQ[40:47] DQ[48:55] DQ[56:63]
Command/Address/Clock (DCA)
1x DRAM DQ Rate
2x DRAM DQ Rate
Host Memory Controller
34
30
CPU
32
Motherboard

MULTI-ACCESS MEMORY MODULES

BACKGROUND

The present disclosure relates to a memory system for a computer and, more specifically, communication between a host memory controller and one or more memory module.

BACKGROUND OF THE RELATED ART

A motherboard, mainboard or system board, is a main printed circuit board (PCB) in a computer, such as a general-purpose computer or a server. Regardless of the specific architecture or form factor of the computer, the motherboard serves to aggregate components into one system and supports communication between many critical components of the system. For example, the motherboard may directly support a central processing unit (CPU), an input/output controller, a memory controller, and various connectors for memory and peripheral devices. In particular, the motherboard may have a set number of memory module slots for securing replaceable memory modules and a set number of serial computer expansion bus slots for securing any of a wide variety of expansion cards, such as graphics cards, hard disk drive host adapters, solid state drives and network interface controllers. However, the limited and fixed number of memory module slots and serial computer expansion bus slots must be used wisely to accommodate all the functionality and capacity that may be desired for the computer.

BRIEF SUMMARY

Some embodiments provide an apparatus comprising a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact. The apparatus further comprises a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line. Still further, the apparatus comprises a data conversion module connected to the second memory-side data contacts for communicating data signals with the data buffer and multiplexer devices and connected to the second memory-side command and address contact for communicating command and address signals with the registered clock driver, the data conversion module for converting parallel data signals from the data buffer and multiplexer devices to serial data signals for communicating over a serial computer expansion bus with a second memory module and for converting serial data signals received from the second memory module over the serial computer expansion bus to parallel data signals for communicating with the data buffer and multiplexer devices. In addition, the data buffer and multiplexer devices communicate data signals with the host memory controller at twice the clock rate that the data buffer and multiplexer devices communicate data signals with the dynamic random-access memory chips and the data conversion module.

Some embodiments provide an apparatus comprising a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact. The apparatus further comprises a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line. Still further, the apparatus comprises a first data conversion module connected to the second memory-side data contacts of a first subset of the data buffer and multiplexer devices and connected to the second memory-side command and address contact for communicating command and address signals with the registered clock driver, the first data conversion module for converting parallel data signals from the first subset of data buffer and multiplexer devices to serial data signals for communicating over a serial computer expansion bus with a second memory module and for converting serial data signals received from the second memory module over the serial computer expansion bus to parallel data signals for communicating with the first subset of data buffer and multiplexer devices; and a second data conversion module connected to the second memory-side data contacts of a second subset of the data buffer and multiplexer devices and connected to the second memory-side command and address contact for communicating command and address signals with the registered clock driver, the second data conversion module for converting parallel data signals from the second subset of data buffer and multiplexer devices to serial data signals for communicating over a serial computer expansion bus with a third memory module and for converting serial data signals received from the third memory module over the serial computer expansion bus to parallel data signals for communicating with the second subset of data buffer and multiplexer devices. In addition, the plurality of data buffer and multiplexer devices communicate data signals with the host memory controller at twice the clock rate that the data buffer and multiplexer devices communicate data signals with the dynamic random-access memory chips and the first and second data conversion modules.

DETAILED DESCRIPTION

Figure 1:
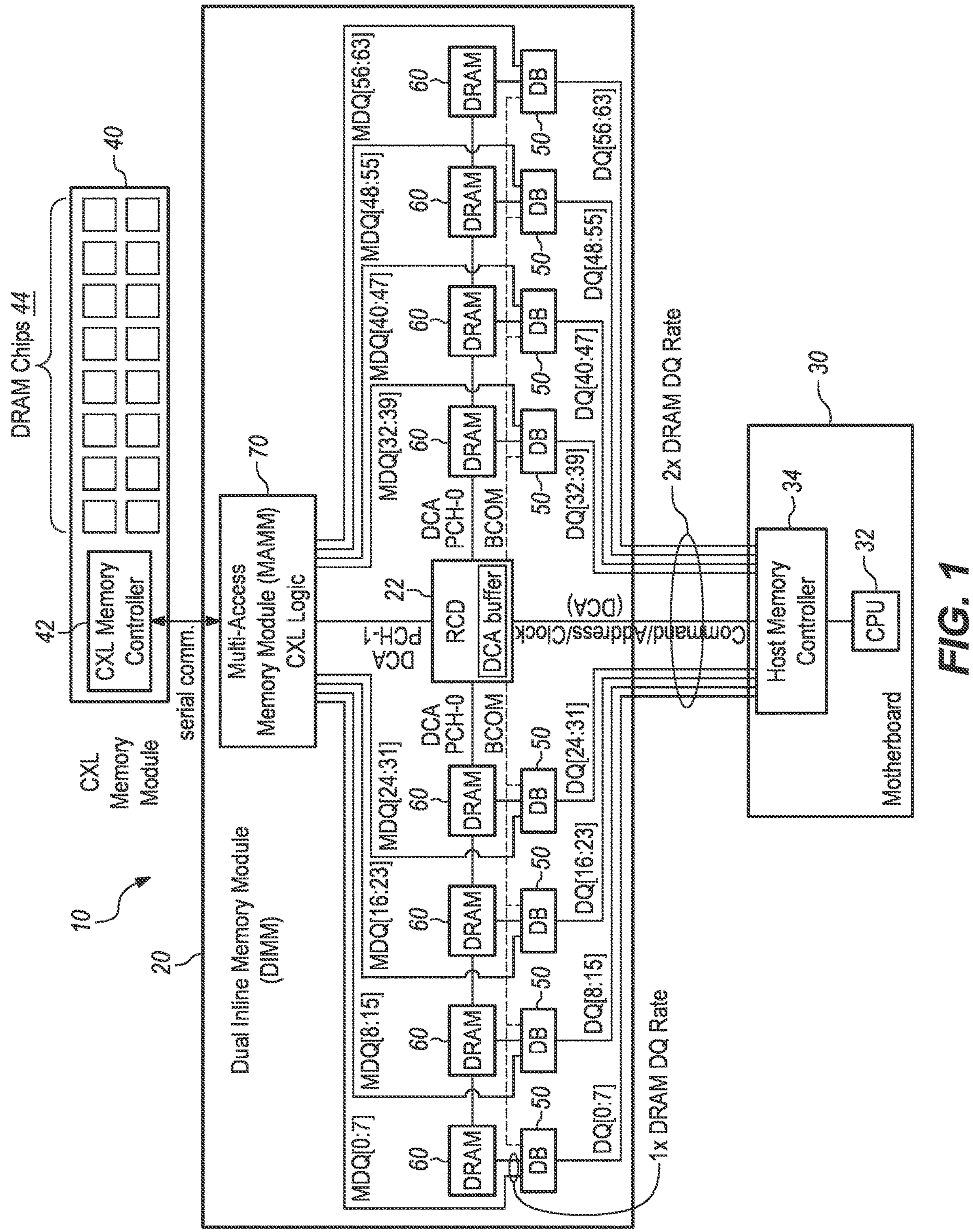
FIG. 1 is a diagram of a system including a dual inline memory module (DIMM) that provides for memory expansion through a connection to a CXL memory module.

Some embodiments provide an apparatus comprising a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact. The apparatus further comprises a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line. Still further, the apparatus comprises a data conversion module connected to the second memory-side data contacts for communicating data signals with the data buffer and multiplexer devices and connected to the second memory-side command and address contact for communicating command and address signals with the registered clock driver, the data conversion module for converting parallel data signals from the data buffer and multiplexer devices to serial data signals for communicating over a serial computer expansion bus with a second memory module and for converting serial data signals received from the second memory module over the serial computer expansion bus to parallel data signals for communicating with the data buffer and multiplexer devices. In addition, the data buffer and multiplexer devices communicate data signals with the host memory controller at twice the clock rate that the data buffer and multiplexer devices communicate data signals with the dynamic random-access memory chips and the data conversion module.

A data buffer and multiplexer device, also referred to a multiplexed ranks (MR) logic device or simply "data buffer" (DB), may include a built-in multiplexer/demultiplexer (mux/de-mux) circuit on the data in/out (DQ) bus. The data buffer and multiplexer device may be similar to a data buffer of an LRDIMM (Load Reduced Dual In-line Memory Module). A data buffer and multiplexer device (DB) is a logic chip that buffers data, such as the data to be written to or being read from a particular address on a memory module, such as a DIMM. In one embodiment, the data buffer and multiplexer device may have 8-bit DQ lines that are connected to a data bus from the Host Memory Controller.

The data buffer and multiplexer device may also be connected to a first 8-bit MDQ pseudo-channel (PCH0) that provides communication with a first rank of memory and a second 8-bit MDQ pseudo-channel (PCH1) that provides communication with a second rank of memory. The acronym "MDQ" is used to represent the buffered (memory-side) copy of the host-side data signal (DQ). The DQ's (i.e., bits 0-7) may be driven from the host to the data buffer and multiplexer devices at 2× speed (for example, DDR5-8800), then driven from the data buffer and multiplexer devices to memory at 1× speed, where half of the data that the data buffer and multiplexer devices receive from the host is driven to a first memory device, such as a DRAM chip, on PCH0.MDQ (for example, DDR5-4400) and where other half of the received data is driven from the data buffer and multiplexer device to a second memory device, such as another DRAM chip, on PCH1.MDQ (for example, DDR5-4400). Optionally, each data buffer and multiplexer device may drive output simultaneously on the first memory-side data contacts and the second memory-side data contacts. In one option, the DB may output one or two differential pairs sending all the bits, such as one differential pair for transmitting signals (Tx) and one differential pair for receiving signals (Rx). For example, the transmit pair (Tx) could send all eight bits (i.e., DQ[0:7]) received by the DB serially over a high-speed link to the data conversion module, which would no longer be responsible for serializing the output from the DB. Similarly, the receive pair (Rx) to the data buffer could serially receive data back from the data conversion module and convert the data to DDR before sending the data to the host memory controller (i.e., as DQ[0:7]).

The data buffer and multiplexer device may use the memory-side pseudo channels to simultaneously access the first memory module, such as local DRAM, and the second memory module or device via the data conversion device (also referred to as a Multi-Access Memory Module (MAMM) Computer Express Link (CXL) Logic module) in the same manner as if the data buffer and multiplexer device were simultaneously accessing two ranks of local DRAM. The Host Memory Controller may direct a particular command to the DRAM on the desired first or second memory module using memory addresses. In some embodiments, the data buffer and multiplexer devices handle data signals (DQ) and the Registered Clock Driver (RCD) only handles command, address and clock signals (DCA). It should also be understood that the Host Memory Controller may be a separate module or may be part of the host system CPU.

The data buffer and multiplexer devices, along with the first and second memory Modules, enable implementation of two multiplexed ranks of memory. Some embodiments double the memory bandwidth by the data buffer and multiplexer devices accessing two memory modules (perhaps both having Dynamic Random-Access Memory (DRAM) chips) at regular frequency (1×) simultaneously and driving data on a Double Data Rate (DDR) bus with the host memory controller at double (2×) the regular frequency. Optionally, the data buffer and multiplexer devices may communicate data signals with the dynamic random-access memory chips and the data conversion module according to a double data rate (1×) signal.

The term "DQ rate" refers to the data rate of the data bit signals. The "D" may refer to input signals and the "Q" may refer to output signals. For example, the DDR5-4800 DRAM has data transferred on each DQ data pin at a rate of 4800 megabits per second (Mbps). Furthermore, the host memory controller may have any number of one or more double-data rate (DDR) channels, such as 2 to 12 channels or more. The host memory controller is able to simultaneously access both the first and second memory modules using the pseudo channels (PCHs). Specifically, the first memory module may form a first memory rank and the second memory module or device may form a second memory rank.

The Registered Clock Driver (RCD) is a buffer and multiplexer for the control lines (command and address), but not for the data lines. The RCD also maps independent Command and Address (CA) access to the corresponding memory modules (i.e., the corresponding multiplexed ranks) using pseudo-channels (PCHs). Specifically, the RCD is connected to the DQ bus/channel for communication with the host memory controller and receives command and address signals from the host memory controller at a 2× data rate. After receiving first and second command and address signals from the host memory controller at 2× speed, the RCD may redrive the first command and address signal out to a first rank (Rank 0) of DRAM at 1× speed over a first pseudo-channel (PCH-0) and redrive the second command and address signal out to a second rank (Rank 1) of DRAM or other memory over a second pseudo-channel (PCH-1) at 1× speed. The RCD may also redrive the clock signals directly to the first memory module and indirectly to the second memory module via the data conversion module. Optionally, the registered clock driver includes a command and address buffer, and wherein the registered clock driver drives output simultaneously on the first memory-side command and address contact and the second memory-side command and address contact. Embodiments may include a discrete, dedicated RCD, but the RCD functionality could be built into the data conversion module such that the CA is initially driven to the data conversion module and then driven back to the DRAM of the first memory module.

In some embodiments, the RCD may determine which memory access is being directed to the first memory module (i.e., local DRAM) and which memory access is being directed to the second memory module (i.e., CXL memory module) based upon the address in the DCA information received from the host memory controller. Alternatively, the Host Memory Controller may provide the equivalent of a "chip select" by simply always sending memory accesses to the RCD that are directed to the first memory module during the first data transfer of a clock cycle (perhaps on each rising edge of the clock signal) and the always sending memory accesses to the RCD that are directed to the second memory module during the second data transfer (perhaps on each falling edge of the clock signal). Any actual chip select signals may be used to inform the address and/or multiplexer in the DB and/or RCD. Furthermore, the Host Memory Controller could always have one memory access for the first memory module and one memory access for the second memory module, or the Host Memory Controller could skip a memory access for either one or both of the first and second memory modules at any point in time. Typically, the Host Memory Controller will be able to access memory on the first memory module no more than once per 2× DQ rate communication and will be able to access memory on the second memory module no more than once per 2× DQ rate communication.

The data conversion module may also be referred to as a Multi-Access Memory Module (MAMM) chip with Compute Express Link (CXL) logic. The data conversion module is connected to one or more of the data buffer and multiplexer devices and is also connected to a CXL memory device. The data conversion module may provide CXL access to CXL memory device. For example, the data conversion module may be coupled to a connector that may receive a cable for connecting the data conversion module to the CXL memory device. Optionally, the CXL memory may be an Enterprise and Data Center Solid-State Drive (SSD) Form Factor (EDSFF) CXL memory module or other CXL-attached memory. The data conversion module converts DDR accesses to CXL and converts CXL to DDR. Accordingly, the data conversion module may perform the function of a Serializer/Deserializer Transmitter and Receiver (SerDes Tx and Rx) in order to support serial communication over the CXL connection and communicate DDR signals with the data buffer and multiplexer devices. In one option, the serial computer expansion bus implements the Compute Express Link standard and the second memory module is a Compute Express Link memory module. The Compute Express Link (CXL) memory module or standard provides a low latency and high performance, coherent, link-based interface.

In some embodiments, the apparatus may further comprise the second memory module that is connected to the data conversion module through the serial computer expansion bus. The second memory module may include a solid-state drive or the second memory module may include a plurality of dynamic random-access memory chips forming a second rank of dynamic random-access memory chips connected to a memory controller connected to the serial computer expansion bus.

In some embodiments, the plurality of data buffer and multiplexer devices may include eight data buffer and multiplexer devices, and wherein each data buffer and multiplexer device includes eight of the host data contacts, eight of the first memory-side data contacts, and eight of the second memory-side data contacts. Accordingly, the apparatus may handle a 64-bit wide DQ signal with the host memory controller and the first and second memory modules or devices.

In some embodiments, the apparatus may further comprise the plurality of dynamic random-access memory chips installed on the first memory module and connected to the first memory-side data contacts, wherein the plurality of data buffer and multiplexer devices and the data conversion module are installed on the first memory module. Optionally, the first memory module may have the form factor of a dual in-line memory module (DIMM). In a further option, the DIMM may be configured with standard, unmodified, ×4 or ×8 DDR5 DRAMs. Still further, the apparatus may include one data buffer and multiplexer device for each DRAM chip. The data buffer and multiplexer device may be connected between a standard card edge connector (for connecting to the host memory controller) and a DRAM chip. Each data buffer and multiplexer device may also be connected to a data conversion module. For example, the DIMM may have one or more data conversion modules, such as from 1 to 4 data conversion module chips per DIMM. In a further example, from 2 to 8 of the data buffer and multiplexer device chips may connect to any one of the data conversion module chips on the same DIMM. Furthermore, an additional memory module may be connected to each data conversion module using a cable.

In some embodiments, the host memory controller, the plurality of data buffer and multiplexer devices, the registered clock driver and the data conversion module are installed on a motherboard, wherein the motherboard includes a memory module slot connected to the first memory-side data contacts and the first memory-side command and address contact, and wherein the memory module slot is adapted for securing the first memory module in connection with the first memory-side data contacts and the first memory-side command and address contact. Still, the data buffer and multiplexer devices and data conversion modules may operate in the same manner as in embodiments previously described where the data buffer and multiplexer devices and data conversion module(s) are installed on a DIMM. A technical benefit of this embodiment is that both the DIMM and CXL memory module may be standard off-the-shelf components since the data buffer and multiplexer devices and data conversion modules are installed on the motherboard or an interposer that is itself coupled to the motherboard.

In a similar embodiment, the data buffer and multiplexer devices may be installed on the motherboard and the and data conversion modules may be installed on an expansion card or other printed circuit board that supports connections to one or more CXL memory module. It should be appreciated that this embodiment and other configurations may be implemented in various manners while maintaining the functional equivalence of the disclosed embodiments.

In some embodiments, the apparatus may further comprise the plurality of dynamic random-access memory chips installed on the first memory module, wherein the first memory module is connected to the memory module slot. For example, the first memory module may be a dual in-line memory module.

In some embodiments, the plurality of data buffer and multiplexer devices, the registered clock driver and the data conversion module are installed on an interposer for connecting to a motherboard including the host memory controller, the first memory module including the plurality of dynamic random-access memory chips, and the second memory module. A technical benefit of this embodiment is that the DIMM, the CXL memory module and the motherboard may each be standard off-the-shelf components since the data buffer and multiplexer devices and the data conversion module(s) are installed on the interposer that is itself coupled to the motherboard.

Some embodiments provide an apparatus comprising a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact. The apparatus further comprises a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line. Still further, the apparatus comprises a first data conversion module connected to the second memory-side data contacts of a first subset of the data buffer and multiplexer devices and connected to the second memory-side command and address contact for communicating command and address signals with the registered clock driver, the first data conversion module for converting parallel data signals from the first subset of data buffer and multiplexer devices to serial data signals for communicating over a serial computer expansion bus with a second memory module and for converting serial data signals received from the second memory module over the serial computer expansion bus to parallel data signals for communicating with the first subset of data buffer and multiplexer devices; and a second data conversion module connected to the second memory-side data contacts of a second subset of the data buffer and multiplexer devices and connected to the second memory-side command and address contact for communicating command and address signals with the registered clock driver, the second data conversion module for converting parallel data signals from the second subset of data buffer and multiplexer devices to serial data signals for communicating over a serial computer expansion bus with a third memory module and for converting serial data signals received from the third memory module over the serial computer expansion bus to parallel data signals for communicating with the second subset of data buffer and multiplexer devices. In addition, the plurality of data buffer and multiplexer devices communicate data signals with the host memory controller at twice the clock rate that the data buffer and multiplexer devices communicate data signals with the dynamic random-access memory chips and the first and second data conversion modules.

In some embodiments, the apparatus further comprises the second memory module connected to the first data conversion module through the first serial computer expansion bus, and the third memory module connected to the second data conversion module through the second serial computer expansion bus. For example, each data conversion module (chip) may be connected to one instance of the second memory module, such as a CXL memory module. Accordingly, a system CPU may communicate with a given DIMM to access DRAM residing on the DIMM as well as DRAM or other memory type residing on each CXL memory module. Regular memory accesses directed to the DRAM residing on the DIMM may occur independently and/or simultaneously with CXL memory accesses directed to the memory residing on the CXL-attached memory module.

Embodiments of the apparatus may enable a significant expansion of memory capacity and bandwidth that is available within a single compute node. As a further benefit, this expansion of memory capacity and bandwidth is accomplished without requiring the use of Peripheral Component Interconnect Express (PCIe) and/or Compute Express Link (CXL) lanes that are already available on the motherboard. These PCIe and/or CXL lanes are valuable for use with a wide variety of expansion card types, including, but not limited to, memory expansion. However, embodiments may expand memory using external CXL-attached memory modules connected to a data conversion module so that the available PCIe and/or CXL lanes on the motherboard may be utilized for connecting storage devices, input/output devices, graphics processing units, and/or still further memory.

FIG. 1 is a diagram of a system 10 including a dual inline memory module (DIMM) 20 that is connected to a motherboard 30 and provides for memory expansion through a connection to a CXL memory module 40. Abbreviations and alternative names for components are either identified in reference to FIG. 1 or have been previously identified. In some instances, an abbreviation or alternative name is used for convenience or to fit into the diagram but is not intended to limit the scope of the disclosure.

The motherboard 30 includes a central processing unit (CPU) 32 and a host memory controller 34. While the host memory controller is illustrated as a separate component, the functionality of the host memory controller 34 may be built into the central processing unit 32. To support some embodiments, the host memory controller 34 is shown to drive a memory bus at twice/double (2×) a DRAM DQ rate. Without limitation, the memory bus is illustrated having 64 data bits (DQ) connected to the data buffer and multiplexer devices 50 and a command, address and clock (DCA) connection with a registered clock driver 22.

The data buffer and multiplexer devices 50 receive the data bits (DQ) from the host memory controller 34 as the 2× DQ rate. In this illustration, there are eight (8) data buffer and multiplexer devices 50 that operate in the same manner, but each data buffer and multiplexer device 50 can receive or transmit 8 bits of the 64-bit memory bus. Each data buffer and multiplexer device 50 has a first pseudo channel (PCH0) connected to a DRAM chip 60 that is local to the DIMM 20. Each data buffer and multiplexer device 50 also has a second pseudo channel (PCH1) connected to a data conversion module (MAMM CXL Logic chip) 70 that is local to the DIMM 20. The data buffer and multiplexer devices 50 send and receive memory-side data bits (MDQ) over the first and second pseudo channels at a single (1×) DRAM DQ rate. Preferably, the data buffer and multiplexer devices 50 may simultaneously communicate memory-side data bits (MDQ) over both the first and second pseudo channels. Accordingly, a multiplexer may have a single input for each bit of the host memory bus and two outputs for each bit. In this example, there would be eight (8) inputs corresponding to the eight bits and sixteen (16) outputs, where eight (8) outputs are directed to the local DRAM 60 and another eight (8) outputs are directed to the data conversion module 70. For example, the data buffer and multiplexer devices 50 may sequentially receive a first 8-bit input signal from the host and then receive a second 8-bit input signal from the host at the 2× DQ rate. The data buffer and multiplexer devices 50 may operate as a demultiplexer to direct the first 8-bit input signal to a first buffer and then direct the second 8-bit input signal to a second buffer. Subsequently, the data buffer and multiplexer devices 50 may then simultaneously send the 8 bits from the first buffer as output to the local DRAM 60 and send the 8 bits from the second buffer as output to the data conversion module 70. Alternatively, rather than buffer the second 8 bits, the second 8 bits could be immediately sent from the multiplexer to the data conversion module 70 and simultaneously send the 8 bits from the first buffer as output to the local DRAM 60 (or the second 8 bits could be immediately sent from the multiplexer to the local DRAM 60 and simultaneously send the 8 bits from the first buffer as output to the data conversion module 70).

The registered clock driver 22 receives the command, address and clock (DCA) signals from the host memory control 34, which are also sent at 2×DRAM DQ rate. Similar to the data buffer and multiplexer devices 50, the registered clock driver 22 will receive first command and address signals or information (CA) and store the first command and address information in a first command and address buffer. The registered clock driver 22 will then receive second command and address signals or information (CA). While the second command and address information may or may not be stored in a second command and address buffer, the first and second command and address information may be simultaneously sent to the local DRAM 60 and the data conversion module 70. Most preferably, the first and second command and address information are not only sent simultaneous with each other, but also simultaneous with the memory-side data bits (MDQ) being data by the buffer and multiplexer devices 50 over the first and second pseudo channels to the local DRAM 60 and data conversion module 70. In this case, the local DRAM 60 may receive memory-side data (MDQ) and command and address information (CA) at the same time and may, therefore, associated the command and address information with the received data. Similarly, the data conversion module 70 may receive memory-side data (MDQ) and command and address information (CA) at the same time and may, therefore, associated the command and address information with the received data. For example, both the local DRAM 60 and the data conversion module 70 will execute the received command, such as a read or write command, with respect to the accompanying memory address. If the command is a write command, then the associated data received at the same time is written to the accompanying memory address. Furthermore, each of the memory-side data (MDQ) signals and memory-side command and address (CA) signals may be transmitted at a single (1×) DRAM DQ rate.

When the data conversion module 70 receives memory-side data (MDQ) signals and memory-side command and address (CA) signals, the data conversion module 70 will convert the data, command and address information to a serial communication format and transmit the information serially to a second memory module, which may be an external memory module (i.e., external to the DIMM 20). In the present illustration, the second memory module is a CXL memory module 40 and the data conversion module 70 uses CXL logic to communicate with the CXL memory module 40 according to the Computer Express Link (CXL) standard. The CXL memory module 40 may include a CXL memory controller 42 and a plurality of memory chips 44. The memory chips 44 may DRAM chips or form solid state memory or storage. Accordingly, the data conversion module 70 may perform a DDR-to-CXL conversion before sending serialized data, command and address information to the CXL memory module 40, and may perform a CXL-to-DDR conversion on data, command and address information received from the CXL memory module 40.

Figure 2:
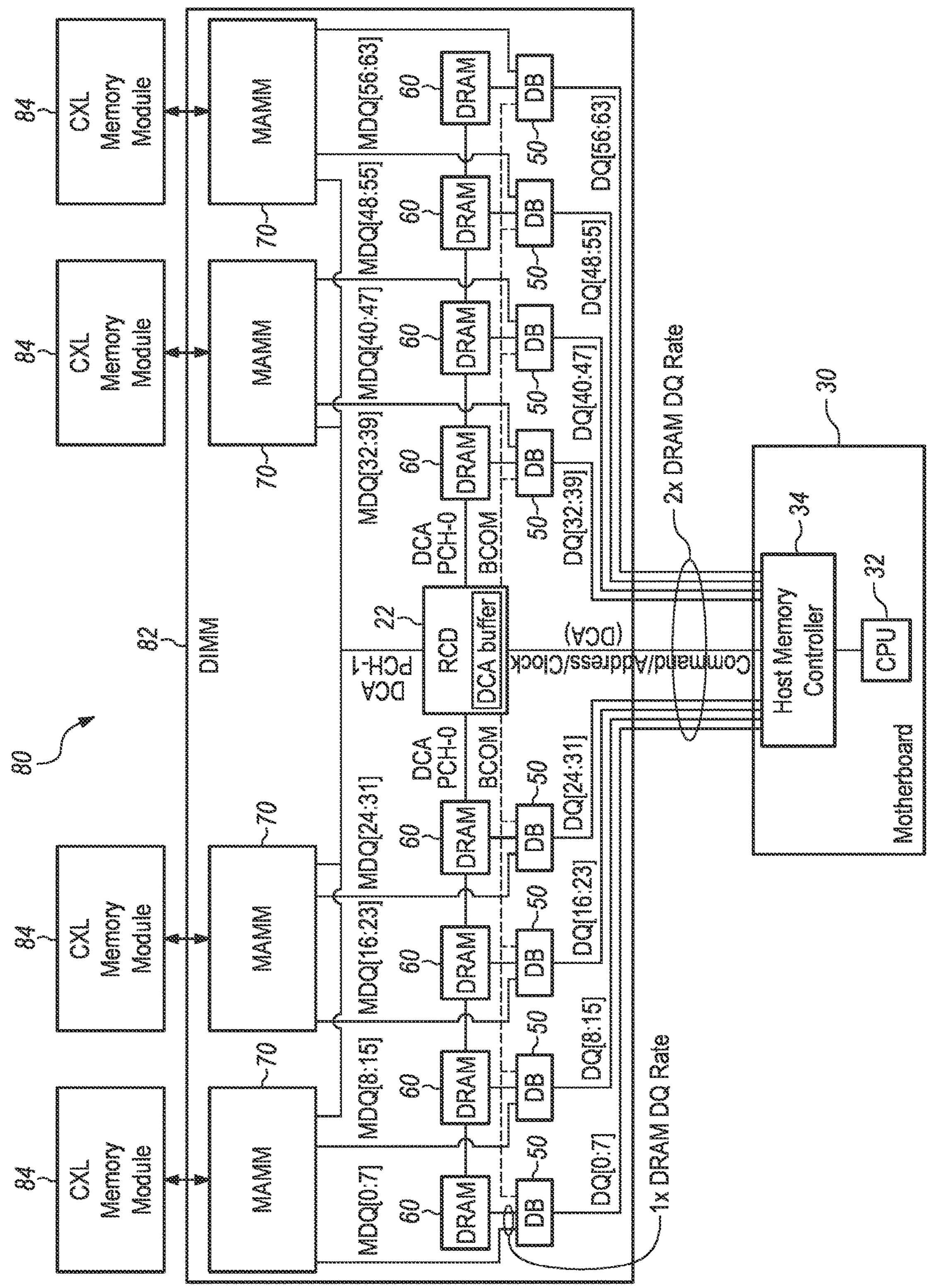
FIG. 2 is a diagram of a system including a dual inline memory module (DIMM) that provides for memory expansion through connections to multiple CXL memory modules.

FIG. 2 is a diagram of a system 80 including a dual inline memory module (DIMM) 82 that includes multiple data conversion devices 70 ("MAMM") that provide for memory expansion through connections to multiple CXL memory modules 84. The connections and operations of the host memory controller 34 to the data buffer and multiplexer devices 50 and the registered clock driver (RCD) 22 may be the same as in system 10 of FIG. 1. Similarly, the connections and operations of the data conversion devices 70 and their connections to an attached CXL memory module 84 may be the same as in system 10 of FIG. 1. However, each of the four data conversion devices 70 receives data from only two of the data buffer and multiplexer devices (DB) 50, whereas the single data conversion device 70 in FIG. 1 received data from all either (8) of the data buffer and multiplexer devices (DB) 50. The system 80 allows for the use of four CXL memory modules 84, which still perform as a single rank, while the local DRAM 60 provides a second rank for the system.

Figure 3:
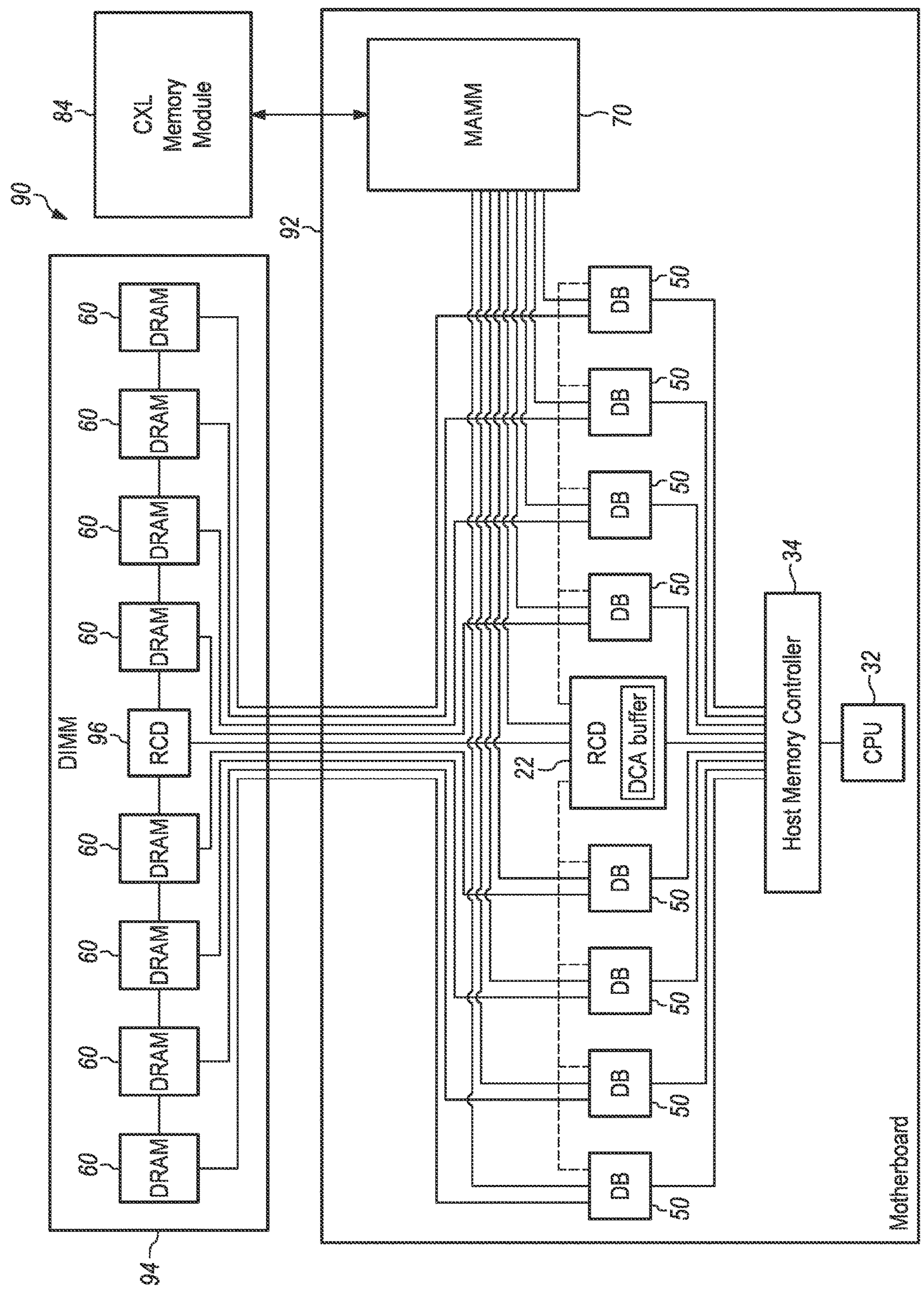
FIG. 3 is a diagram of a system including a motherboard that supports a conventional dual inline memory module (DIMM) and a conventional CXL memory module on a single channel.

FIG. 3 is a diagram of a system 90 including a motherboard 92 that supports a conventional dual inline memory module (DIMM) 94 and a conventional CXL memory module 96 on a single channel. The motherboard 92 includes the data buffer and multiplexer devices (DBs) 50, the registered clock driver (RCD) 22 (or at least another RCD) and the data conversion module (MAMM CXL Logic device) 70 for providing the serialized output to the CXL memory module 84. In one option, the command and address signals (CA) from the host memory controller 34 may be input into the data conversion device 70 to redrive the CA to the DIMM 94, which would likely have its own RCD 96 on the DIMM (RDIMM) 94 for redriving the command, address and clock signals to the DRAM 60. Note that the components shown in system 90, as well as their operation and their interconnection with other components, is substantially the same as the components in either system 10 of FIG. 1 or system 80 in FIG. 2. The difference in system 90 is the data buffer and multiplexer devices (DBs) 50, the registered clock driver (RCD) 22 and the data conversion module 70 are installed on the motherboard 92. Accordingly, the first memory module 94 (such as the DIMM shown) and the second memory module 84 (such as the CXL memory module) may be standard or off-the-shelf memory modules.

Figure 4:
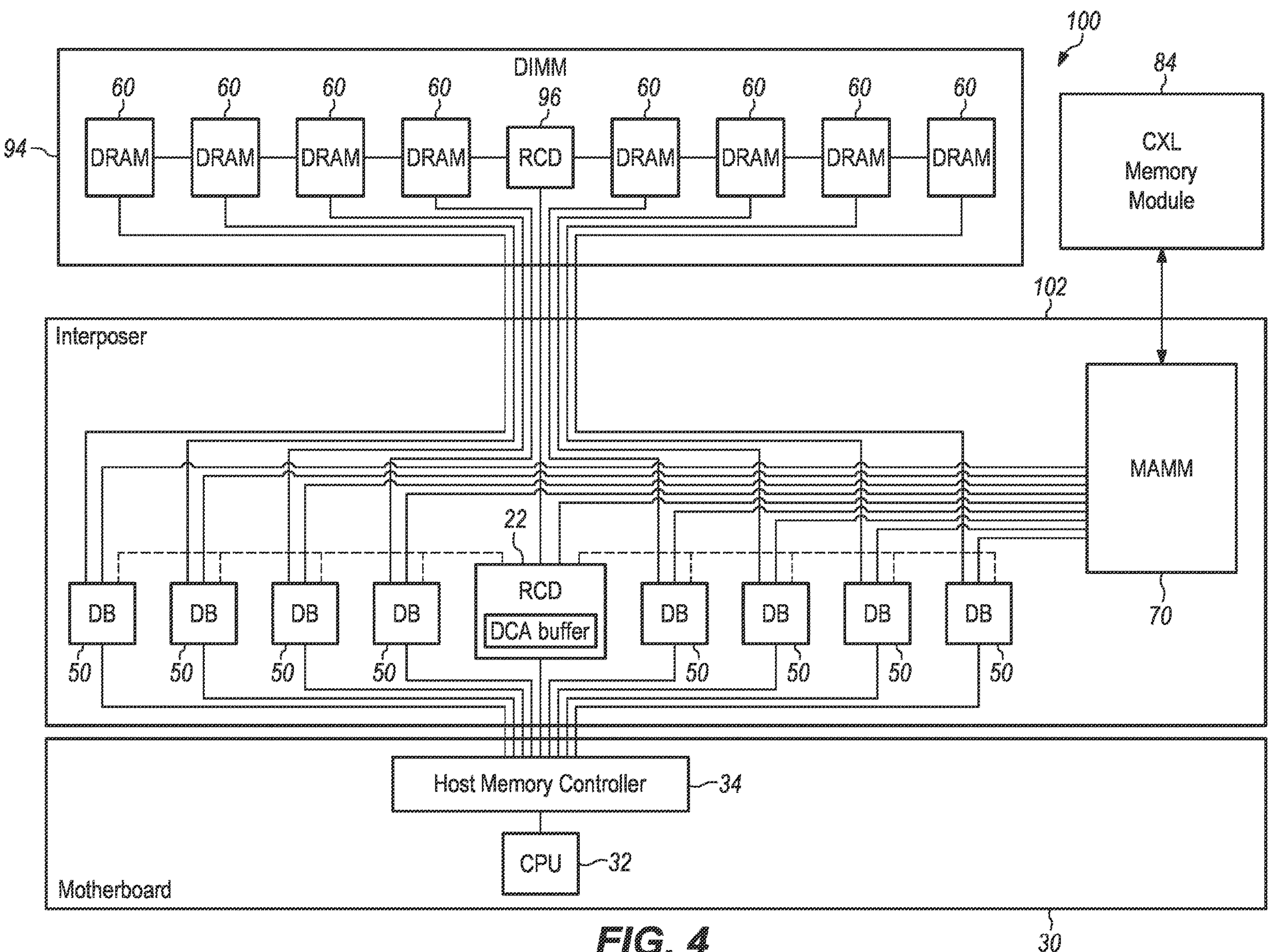
FIG. 4 is a diagram of a system including an interposer that interfaces between a motherboard and both a conventional dual inline memory module (DIMM) and a conventional CXL memory module on a single channel.

FIG. 4 is a diagram of a system 100 including an interposer 102 that interfaces between a motherboard 30 and both a conventional dual inline memory module (DIMM) 94 and a conventional CXL memory module 84 on a single channel. However, compared to system 90 in FIG. 3, system 100 moves the data buffer and multiplexer devices (DBs) 50, the registered clock driver (RCD) 22 and the data conversion module (MAMM CXL Logic device) 70 off the motherboard 30 so that even the motherboard may be a standard or off-the-shelf motherboard. Accordingly, embodiments may be implemented in the interposer 102 for use with otherwise standard components.

The foregoing apparatus embodiments may further be implemented as methods for implementing or initiating any one or more aspects of the apparatus described herein. Accordingly, a separate description of the methods will not be duplicated in the context of a computer program product.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact;

a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line; and a data conversion module connected to the second memory-side data contacts for communicating data signals with the data buffer and multiplexer devices and connected to the second memory-side command and address contact for communicating command and address signals with the registered clock driver, the data conversion module for converting parallel data signals from the data buffer and multiplexer devices to serial data signals for communicating over a serial computer expansion bus with a second memory module and for converting serial data signals received from the second memory module over the serial computer expansion bus to parallel data signals for communicating with the data buffer and multiplexer devices;

wherein the data buffer and multiplexer devices communicate data signals with the host memory controller at twice the clock rate that the data buffer and multiplexer devices communicate data signals with the dynamic random-access memory chips and the data conversion module.

2. The apparatus of claim 1, wherein each data buffer and multiplexer device drives output simultaneously on the first memory-side data contacts and the second memory-side data contacts.

3. The apparatus of claim 1, wherein the registered clock driver includes a command and address buffer, and wherein the registered clock driver drives output simultaneously on the first memory-side command and address contact and the second memory-side command and address contact.

4. The apparatus of claim 1, wherein the data buffer and multiplexer devices communicate data signals with the dynamic random-access memory chips and the data conversion module according to a double data rate signal.

5. The apparatus of claim 1, wherein the serial computer expansion bus implements the Compute Express Link standard and the second memory module is a Compute Express Link memory module.

6. The apparatus of claim 5, wherein the data conversion module converts double data rate memory access to Compute Express Link memory accesses and converts Compute Express Link memory accesses to double data rate memory accesses.

7. The apparatus of claim 1, wherein the first memory module forms a first memory rank and the second memory module forms a second memory rank.

8. The apparatus of claim 1, wherein the plurality of data buffer and multiplexer devices include eight data buffer and multiplexer devices, and wherein each data buffer and multiplexer device includes eight of the host data contacts, eight of the first memory-side data contacts, and eight of the second memory-side data contacts.

9. The apparatus of claim 1, further comprising:

the second memory module connected to the data conversion module through the serial computer expansion bus.

10. The apparatus of claim 9, wherein the second memory module includes a solid-state drive.

11. The apparatus of claim 9, wherein the second memory module includes a plurality of dynamic random-access memory chips forming a second rank of dynamic random-access memory chips connected to a memory controller connected to the serial computer expansion bus.

12. The apparatus of claim 1, further comprising:

the plurality of dynamic random-access memory chips installed on the first memory module and connected to the first memory-side data contacts, wherein the plurality of data buffer and multiplexer devices and the data conversion module are installed on the first memory module.

13. The apparatus of claim 12, wherein the first memory module has the form factor of a dual in-line memory module.

14. The apparatus of claim 13, wherein the second memory module is connected to the data conversion module using a cable.

15. The apparatus of claim 1, wherein the host memory controller, the plurality of data buffer and multiplexer devices, the registered clock driver and the data conversion module are installed on a motherboard, and wherein the motherboard includes a memory module slot connected to the first memory-side data contacts and the first memory-side command and address contact, and wherein the memory module slot is adapted for securing the first memory module in connection with the first memory-side data contacts and the first memory-side command and address contact.

16. The apparatus of claim 15, further comprising:

the plurality of dynamic random-access memory chips installed on the first memory module, wherein the first memory module is connected to the memory module slot.

17. The apparatus of claim 16, wherein the first memory module is a dual in-line memory module.

18. The apparatus of claim 1, wherein the plurality of data buffer and multiplexer devices, the registered clock driver and the data conversion module are installed on an interposer for connecting to a motherboard including the host memory controller, the first memory module including the plurality of dynamic random-access memory chips, and the second memory module.

19. An apparatus, comprising:

a plurality of data buffer and multiplexer devices, each data buffer and multiplexer device having host data contacts for communicating data signals with a host memory controller, first memory-side data contacts for communicating data signals with one of a plurality of dynamic random-access memory chips on a first memory module, second memory-side data contacts and a control line contact;

a registered clock driver having a host command and address contact for communicating command and address signals with the host memory controller, a first memory-side command and address contact for communicating command and address signals with the dynamic random-access memory chips of the first memory module, a second memory-side command and address contact, and a buffer communication contact connected to the control line;

a first data conversion module connected to the second memory-side data contacts of a first subset of the data buffer and multiplexer devices and connected to the second memory-side command and address contact for communicating command and address signals with the registered clock driver, the first data conversion module for converting parallel data signals from the first subset of data buffer and multiplexer devices to serial data signals for communicating over a first serial computer expansion bus with a second memory module and for converting serial data signals received from the second memory module over the first serial computer expansion bus to parallel data signals for communicating with the first subset of data buffer and multiplexer devices; and a second data conversion module connected to the second memory-side data contacts of a second subset of the data buffer and multiplexer devices and connected to the second memory-side command and address contact for communicating command and address signals with the registered clock driver, the second data conversion module for converting parallel data signals from the second subset of data buffer and multiplexer devices to serial data signals for communicating over a second serial computer expansion bus with a third memory module and for converting serial data signals received from the third memory module over the second serial computer expansion bus to parallel data signals for communicating with the second subset of data buffer and multiplexer devices;

wherein the plurality of data buffer and multiplexer devices communicate data signals with the host memory controller at twice the clock rate that the data buffer and multiplexer devices communicate data signals with the dynamic random-access memory chips and the first and second data conversion modules.

20. The apparatus of claim 19, further comprising:

the second memory module connected to the first data conversion module through the first serial computer expansion bus; and the third memory module connected to the second data conversion module through the second serial computer expansion bus.

* * * * *